United States Patent [19]
Parsons

[11] Patent Number: 6,025,844
[45] Date of Patent: *Feb. 15, 2000

[54] METHOD AND SYSTEM FOR CREATING DYNAMIC LINK VIEWS

[75] Inventor: Paige K. Parsons, Atherton, Calif.

[73] Assignee: Netscape Communications Corporation, Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/919,425

[22] Filed: Aug. 27, 1997

Related U.S. Application Data

[60] Provisional application No. 60/049,425, Jun. 12, 1997.

[51] Int. Cl.[7] .................................................... G06F 3/14
[52] U.S. Cl. .......................... 345/357; 345/340; 345/352; 345/346
[58] Field of Search ...................................... 345/334, 335, 345/339, 340, 346, 356, 357; 707/501

[56] References Cited

U.S. PATENT DOCUMENTS

| | | | |
|---|---|---|---|
| 5,583,984 | 12/1996 | Conrad et al. | 345/340 |
| 5,708,825 | 1/1998 | Sotomayor | 707/501 |
| 5,714,971 | 2/1998 | Shalit et al. | 345/340 |
| 5,835,091 | 11/1998 | Bailey et al. | 345/346 |
| 5,917,492 | 6/1999 | Bereiter et al. | 345/357 |
| 5,923,328 | 7/1999 | Griesmer | 345/357 |

OTHER PUBLICATIONS

Furnas, George W., "Effective View Navigation", CHI 97, 22–27 Mar. 1997, pp. 367–374.
Holmquist, Lars Erik, "Focus+Context Visualization with Flip Zooming and the Zoom Browser".
Kandogan, Eser and Shneiderman, Ben, "Elastic Windows: Evaluation of Multi–Window Operations," CHI 97, 22–27 Mar. 1997, pp. 250–257.
Dumas, Joseph and Parsons, Paige, "Discovering the Way Programmers Think About New Programming Environments, " Communications of the ACM, Jun. 1995, vol. 38, No. 6, pp. 45–56.
Rose, Charlton D., "The Netscape Frames Tutorial™", 3rd edition, revised for Netscape 3.
Apple Dylan, Technology Release 1, Using the Apple Dylan Development Environment (Preliminary).
Microsoft MSDN—Microsoft Frontpage Explorer, 1996.

Primary Examiner—Raymond J. Bayerl
Assistant Examiner—Chadwick A. Jackson
Attorney, Agent, or Firm—Michael A. Glenn

[57] ABSTRACT

An interaction framework is based on user configurable view links, where a view link is created by dragging an icon from a source view, and dropping it onto a target view. When a user subsequently selects an object in the source view, its contents are expanded in the target view. View links enable such multi-view extensions as dynamic sources and dynamic targets, where a view link establishes a dynamic operation, in which a source and/or target relation is dynamically determined, e.g. by an active view.

32 Claims, 11 Drawing Sheets

Active Discussion Subjects

FIG. 1A
(PRIOR ART)

Subject: MSFT Internet Explorer vs NS

FIG. 1B
(PRIOR ART)

Subject: MSFT Internet Explorer vs NSCP Navigator

FIG. 1C
(PRIOR ART)

| ▽ Hide: [Fwd: Client UI Plans
|   Subject: [Fwd: Client UI P

☑ Reuse message list [thread] window
　(All message {s} appear in the same window)

☑ Reuse message window
　(All messages appear in the same window)

FIG. 8
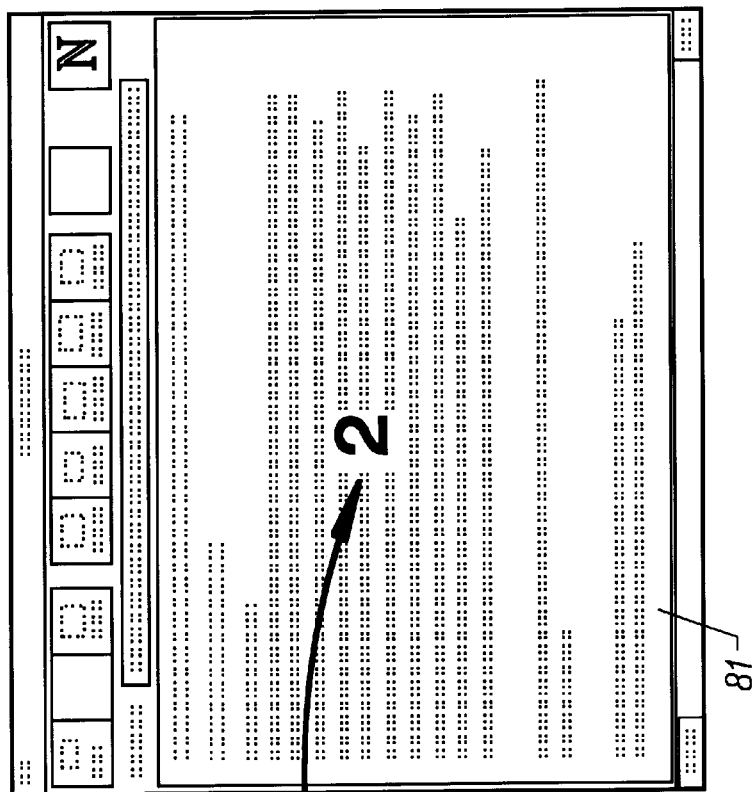
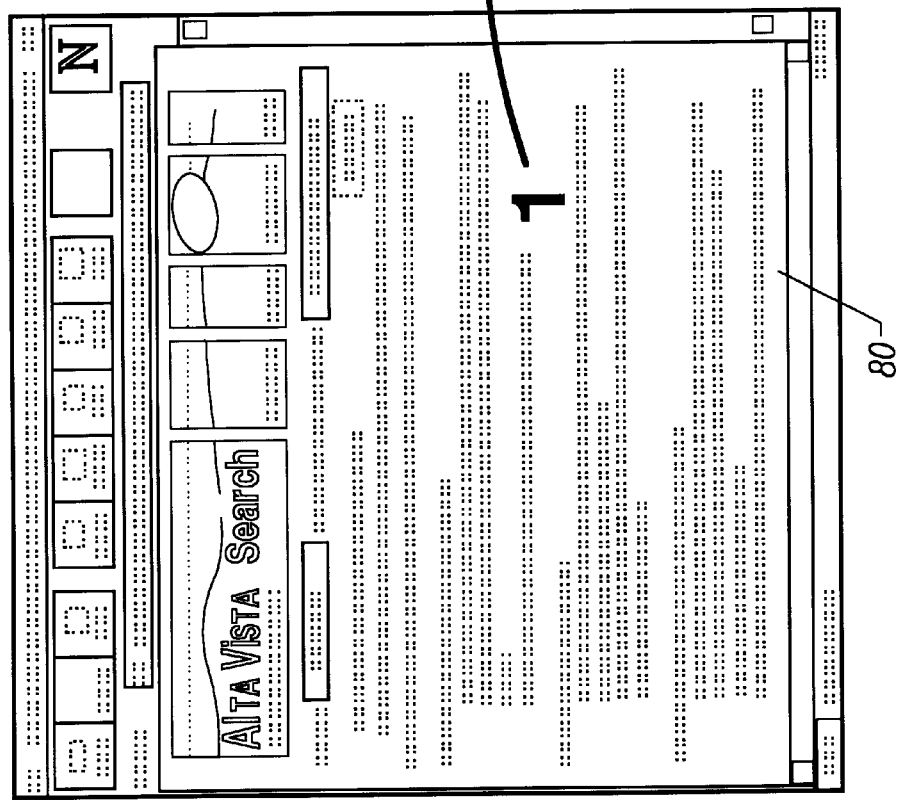

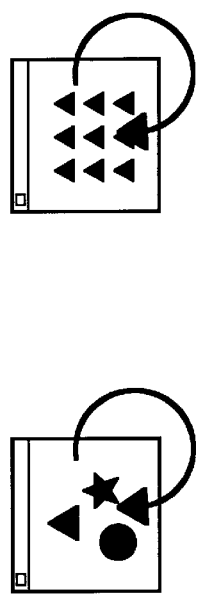
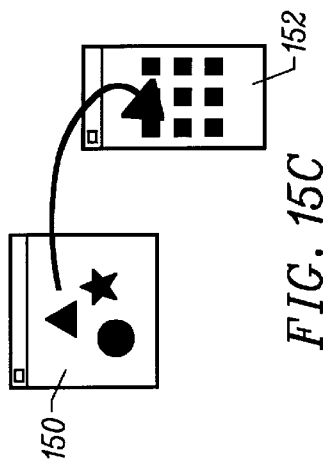
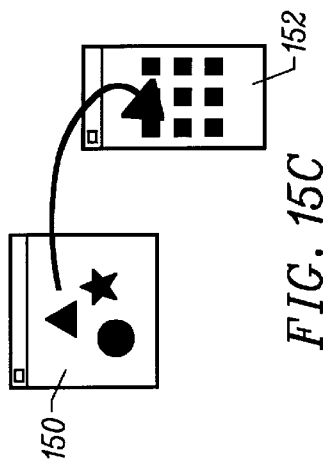
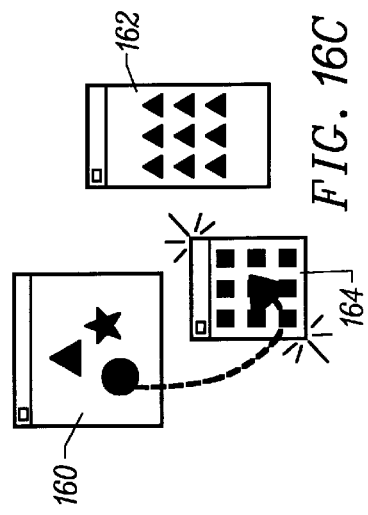
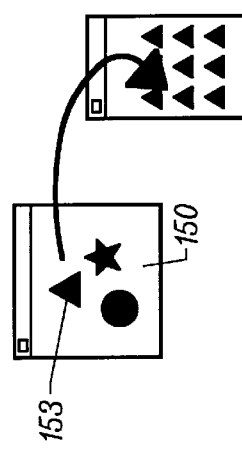
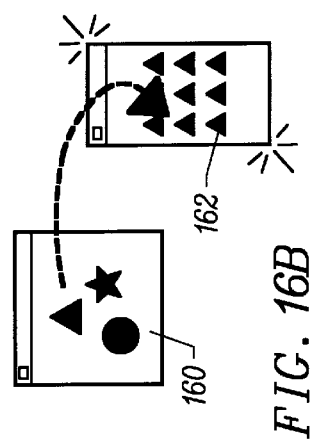
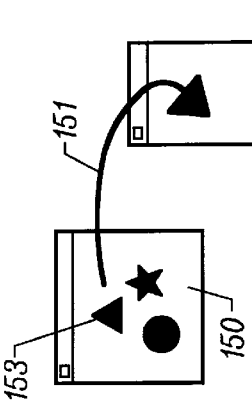
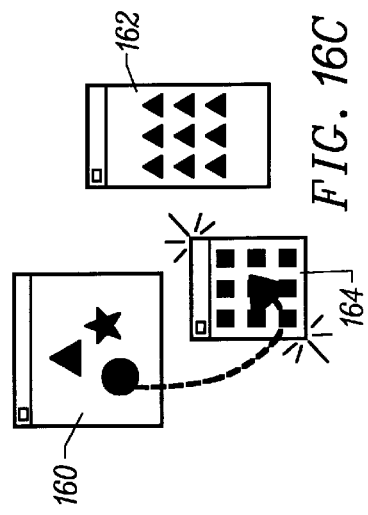

METHOD AND SYSTEM FOR CREATING DYNAMIC LINK VIEWS

This application claims the benefit of U.S. Provisional application Ser. No. 60/049,425 filed Jun. 12, 1997.

BACKGROUND OF THE INVENTION

1. Technical Field

The invention relates to view management. More particularly, the invention relates to graphical user interfaces that provide multiple views of related information.

2. Description of the Prior Art

Graphical user interfaces that provide multiple views of related information (such as frames, panes, or windows) are becoming increasingly prevalent in commercially available software products. Unfortunately, current multi-view interfaces are severely limited by a lack of user level control over the relationships between views, view placement and layout, and view presentation.

Most contemporary windowing systems employ an independent, overlapping windowing model (see, for example, E. Kandogan, B. Shneiderman, *Elastic Windows: Evaluation of Multi-Window Operations,* ACM Conference on Human Factors in Computing Systems SIGCHI 97 (March 1997)). As graphical user interfaces become increasingly information intensive, individual applications within these windowing systems have grown to provide multiple related views of information. These related views are typically ad hoc in their interaction and functionality, i.e. there is little user level control over the relationships between views, view placement and layout, and view presentation.

It is becoming more commonplace for application programs to use multiple linked views to visualize large amounts of content. However, current implementations of these information intensive interfaces give users virtually no control over where a followed link is displayed. Users need ways to arrange and link windows that suit their own tasks. In fact, many users have strongly differing opinions over various approaches to view management. These are quasi-religious arguments for which there are no universally correct answers. While some people prefer multi-paned windows, stacked vertically or horizontally, others despise the paned approach and choose to use separate windows. This diversity of opinions argues for maximum flexibility, allowing users to customize the way in which their views are managed.

The following discussion illustrates these issues through three sample applications, i.e. Netscape Navigator, Netscape Messenger, and filesystem browsers in the Windows 95 and Macintosh operating systems.

Netscape Navigator

Netscape Navigator's default behavior is to follow a link by replacing the current browser context. The Web page author can change this default behavior on a link-by-link basis. For example, HTML-based frames can be created and targeted programmatically by writing HTML or Javascript code. However, the user has no way to change the preprogrammed targeting. This statically defined "one-size-fits-all" behavior may be frustrating and problematic in some common browsing scenarios.

An example of the foregoing involves browsing the set of results returned by a search engine such as Alta Vista. Users typically want to explore several promising sites listed in the page of search results. The typical interaction is to follow a link, look at the page, and then hit the back button to redisplay the search results. There are several problems with this ping-pong approach. First, the user loses context because the search results and followed link are not visible at the same time. Second, the constant switching of contexts requires extra navigation steps.

Another common interaction technique is to right-mouse on the link, and choose open in new window from the context menu. This causes the link to expand in a new window. The problem with this spawning approach is that a large number of temporary windows are explicitly opened and used only briefly before being closed. In addition, a cumbersome pop-up menu must be used for each link traversal.

Neither of these approaches is ideal. The user often wants to use the page of search results as a persistent launcher that opens the links in another specified view. In fact, this approach is so compelling that it is often hard coded into sites that use multiple frames. Unfortunately, few sites expend the effort required to implement this behavior, and users are still unable to customize which view (i.e. frame or window) is used to display the followed link.

News and Discussion Browsers

A related problem is the navigation of highly structured Web content. Examples include HTML-based email, such as hotmail, and newsgroup-like HTML message boards, such as those found at the popular financial discussion site Silicon Investor. When viewing these structured discussions, there are at least two levels of Web page structure above the message that make standard Web navigation techniques suboptimal.

For example, at the Silicon Investor site, users must navigate between a list of active bulletin boards, a list of subject headers for each board, and the actual message contents. Once again, the ping-pong and spawning approaches discussed in the previous section are inadequate, and the problem is exacerbated by the need to manage a larger number of related contexts.

FIGS. 1(*a*)–1(*c*) depict a small number of boards and their content from Silicon Investor. There are five discussion areas (FIG. 1(*a*)), each containing an average of nine mail messages (FIG. 1(*b*)) to be browsed and read (FIG. 1(*c*)), for a total of 51 web pages (one discussion listing+five lists of messages+45 messages).

Using the spawning approach, a separate window is needed for each visited page, for a total of 51 windows and 50 link traversals. In addition, because this link following method is not a default single-click operation, the user must access the context menu 50 times to create the windows, and explicitly close each of the 50 new windows to complete the task. This results in a total of 51 windows and 92 user actions. Using the ping-pong approach, only one window is needed, but the back button must be pressed 50 times to traverse all of the messages, for a total of 101 views and 101 user actions. The inherent multi-level structure of discussion groups make both the ping-pong and the spawning approaches cumbersome for the user.

Clearly neither of these approaches constitutes efficient view traversal (see G. Furnas, *Effective View Navigation,* ACM Conference on Human Factors in Computing Systems SIGCHI 97 (March 1997)). One way to improve the browsing of structured messages such as these is to provide a dedicated view for each of the three levels of structure. Netscape Communicator's special purpose discussion group browser that does just that. The browser provides three related views to manage discussions, as shown in FIG. 2(*a*).

A list of discussion groups appears in a separate window called the message center. The threads and message content can be stacked under each other or displayed in their own windows. This preference is set via a disclosure triangle on the thread window, as depicted in FIG. 2(b). By default, these three related views of discussions are linked, but as FIG. 2(c) shows, users can alternatively choose to always spawn separate windows for threads or mail message content.

Thus, in FIG. 2(a), which shows the Netscape Communicator News Browser, the message center is always a separate window. The arrows indicate link relationships. Selecting a mailbox in view 1 expands into the mailbox in view 2. Selecting a message in view 2 causes the message contents to appear in view 3. FIG. 2(b) is a closeup of the Netscape Messenger mail pane control. Clicking on the triangle creates a separate window for viewing the contents of mail or news messages. FIG. 2(c) shows Netscape Messenger targeting preferences. Users can only choose between two targeting options in the primary mail and news windows, as discussed above.

The news browser provided in Communicator is more flexible than most browsers, and is adequate for many users. However, there are some limitations. First, some useful linked layouts cannot be specified. The most notable omissions are a trio of three-paned layouts shown in FIGS. 3(a)–3(c). The layout of multiple message views is often an important user issue, so it is disconcerting when users cannot use a preferred layout.

Another problem is inconsistent link traversal behavior. Following links to separate windows require a double click; links within the same window are a single click. This inconsistency detracts from the usability of the system. Users expect the same single or double click behavior regardless of the windowing approach.

Filesystem Browsers

Web pages and news readers are not the only applications that concern highly structured information. Traditional filesystem browsers display multiple levels of hierarchically structured information about the computer's local file system. Hard disks contain folders, and each folder contains files, applications, and yet more folders for multiple levels. The user may want to browse different parts or levels of this structure, or compare two or more parts at once. Traditional file system browsers provide little support for these tasks, and the support they do provide is very inconsistent and ad hoc.

FIG. 4 shows Macintosh Finder windows, where the dashed arrow indicates an expanding link with no ongoing relation between the views. There is no way to coordinate multiple windows containing related information in the Macintosh Finder.

The Macintosh Finder, shown in FIG. 4, has no capabilities for multi-view browsing. The Finder's windows are each controlled independently and limited to a single view. There is no way to coordinate multiple windows containing related information. If users want to browse the contents of the system folder quickly, they must either double-click on each folder to spawn off a new window, or use a single window and manipulate the inline disclosure triangles to expose and hide nested levels of structure. The first spawning approach has the same drawbacks as spawning in the Web browsing example discussed above. The disclosure triangle approach is effective for small hierarchies, but quickly becomes unwieldy when there are many objects and the view must be scrolled.

Windows95/NT has more options than the Macintosh, but it is difficult to switch between approaches. In Windows, the user has a choice of three schemes for browsing files, i.e. reuse a single window (as with a Web browser), spawn a new window (as with the Macintosh Finder), or use a special browser called the Explorer. By default, the windowing system employs the reuse approach. When a user double clicks on a folder, the window's contents are replaced with the contents of the selected folder. The user can press the backspace key to move up one level to the folder containing the current folder. This approach is virtually identical to the Web reuse window approach described above and therefore has the same limitations.

Alternatively, the Windows95/NT user can cause folders to expand in multiple independent windows by holding down a modifier key or changing a global preference. This spawning approach is similar to that of the Macintosh Finder and has the same spawning drawbacks discussed above.

The third option is the Windows97 Explorer, as shown in FIG. 5. The view on the left shows only the folders or structure of the file system. Selecting a folder on the left displays its contents on the right. The user is presented with a two-view browser onto the file system, as shown in FIG. 5. This browser shows the folders on the hard disk in the left pane. The entire contents of whichever folder is selected are displayed expanded in the right pane. The two panes are always split left-right with no option for the user to customize the layout. In addition, there is no way to spawn a new Explorer window when browsing in an Explorer window. Even creating a separate, unrelated, old style browsing window is cumbersome, requiring the use of a context menu.

The above examples illustrate the limitations of static linking and show why it impedes browsing. What is needed is a way to link together and manipulate views, and specify layouts of views, dynamically. It would therefore be advantageous to provide users with a mechanism for to expressing and controlling view management issues.

SUMMARY OF THE INVENTION

The invention provides a novel interaction framework based on user configurable view links that overcome current view management limitations. A view link is created by dragging an icon from a source view, and dropping it onto a target view. When the user subsequently selects an object in the source view, its contents are expanded in the target view. View links enable other useful multi-view extensions, such as persistent view sets, saved groups of related views, and link filters. These functions allow the creation of dynamic linked content. Various embodiments of the invention are provided as examples of the herein disclosed view link invention, e.g. in the context of Netscape Navigator, Netscape Messenger, and the Windows 95 and Macintosh file browsers. Thus, in one embodiment of the invention, view links, view sets, and link filters are added to Netscape Navigator and Messenger browsers as backwards compatible, user interface extensions.

BRIEF DESCRIPTION OF THE DRAWINGS

FIGS. 1(a)–1(c) depict a small number of boards and their content from Silicon Investor;

FIG. 8 illustrates an example of a view link according to the invention;

FIG. 13(a) shows a triangle, circle and star which represent a source content; FIG. 13(b) shows selected objects are highlighted; FIG. 13(c) shows multiple smaller symbols that represent an expanded state of a selected content; FIG. 13(d) shows a rectangular window which represents a view; FIG. 13(e) shows arrows that represent expanding a link's contents into a target view; FIG. 13(f) shows arrows that represent moving a current context into a target; and FIG. 13(g) shows dashed arrows that indicate onetime only links according to the invention;

FIGS. 14(a)–14(b) illustrate a target self operation, in which FIG. 14(a) shows before, where a user could select any of three objects; and FIG. 14(b) shows after, where the user selected a triangle, causing it to expand in place according to the invention;

FIGS. 15(a)–15(c): illustrate a target other operation, in which FIG. 15(a) includes an arrow that indicates an established view link between a source and a target; FIG. 15(b) shows that when a user selects a triangle anchor that a link is expanded in a right view; and FIG. 15(c) shows that when the user subsequently selects a circle link, a right view is updated to reflect a new expansion according to the invention;

FIGS. 16(a)–16(c) illustrate a spawning operation, in which FIG. 16(a) shows a user beginning with a single view; FIG. 16(b) shows the user selecting a triangle object causing a new view to be created containing the triangle's link expansion; and FIG. 16(c) shows that when the user selects another link to follow, in this case a circle link, another new view is created containing the link's expansion according to the invention;

FIGS. 17(a)–17(c) illustrate a clone operation, in which FIG. 17(a) shows a user beginning with a single view; FIG. 17(b) shows that the content is cloned into an existing view; and FIG. 17(c) shows that the content is then cloned again into a new view according to the invention;

FIGS. 18(a)–(d) illustrate a dynamic source operation, in which FIG. 18(a) shows a target that is always a right most view and a source that is based upon an active view; FIG. 18(b) shows that when a triangle is selected in a left view, a target view expands the triangle's link; FIG. 18(c) show a new view that is created; and FIG. 18(d) shows the user selecting a new circle anchor in a bottom view causing it to be expanded in a dedicated target view according to the invention;

FIGS. 19(a)–19(d) illustrate a dynamic target operation, in which FIG. 19(a) shows a source that is fixed to be an upper left view; and FIGS. 19(b)–19(d) show that the target iterates between two views each time a link is followed according to the invention;

FIGS. 20(a)–20(b) illustrate a history operation, in which FIG. 20(a) shows an arrow which indicates that selecting a link clones a current content into a right view; and FIG. 20(b) shows that a user selecting a triangle anchor causes the original contents to be cloned in a right view and a triangle link to be expanded in an existing view according to the invention.

DETAILED DESCRIPTION OF THE INVENTION

The invention provides a framework that gives users direct, flexible control for view management. To address the limitations of the prior art, a view management system is provided based upon view links. View links allow the user to establish a persistent relationship between two or more views using a gesture, such as a drag and drop gesture; or by non-cursor techniques, such as menu selection, keyboard commands, and voice actuation.

A core set of useful view link types is disclosed, as well as several novel ways for combining these primitives that enable powerful sets of linked views for information browsing. In addition, link filter and view set extensions to the basic view link mechanism are described. Examples of link filters which generate dynamic content, such as translations and summaries, are also described. View links, view sets, and view filters can be added to Netscape Navigator and Messenger browsers as backwards compatible user interface extensions.

A key feature of the invention, the view link, establishes one or more relationships between multiple views. A view link is established, for example, by dragging an icon representing a source view, and dropping it onto a target view. When the user selects an object in the source view, its contents are expanded (or, alternatively cloned) in the target view. It should be appreciated that view links may be established in any other user interaction with a computer user interface, e.g. via the keyboard, through menu selection, or by voice actuation.

View links enable other useful extensions that provide system level support for information visualization. For example, persistent view sets are saved groups of related views that allow the user to reuse common configurations of linked views and windows; link filters are functions that generate dynamic linked content by executing a filter function that transforms or interprets the data transferred from the source view to the target view.

By allowing users to control how related views of information are linked, the invention provides a mechanism that overcomes the problems created by fixed link relationships.

View Links

Users need to navigate linked pieces of information. How and where links are followed is referred to herein as targeting. For example, by default in Netscape Navigator, clicking on a link replaces the current contents of the window with the contents of the link. This feature can be changed programmatically by specifying a target window or frame in HTML, e.g. <a href="foo.html" target="view name">. One aspect of the invention provides a user level mechanism that offers similar functionality.

Figures 2A, 2B, 2C:
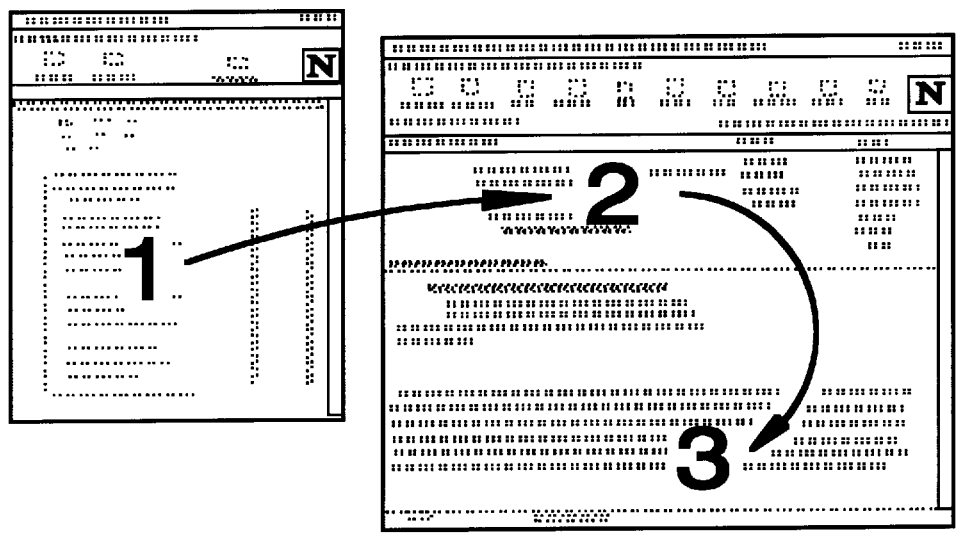
FIG. 2(a) depicts the Netscape Communicator News Browser.
FIG. 2(b) depicts a closeup of the Netscape Messenger mail pane control.
FIG. 2(c) depicts Netscape Messenger targeting preferences.
Figure 3A:
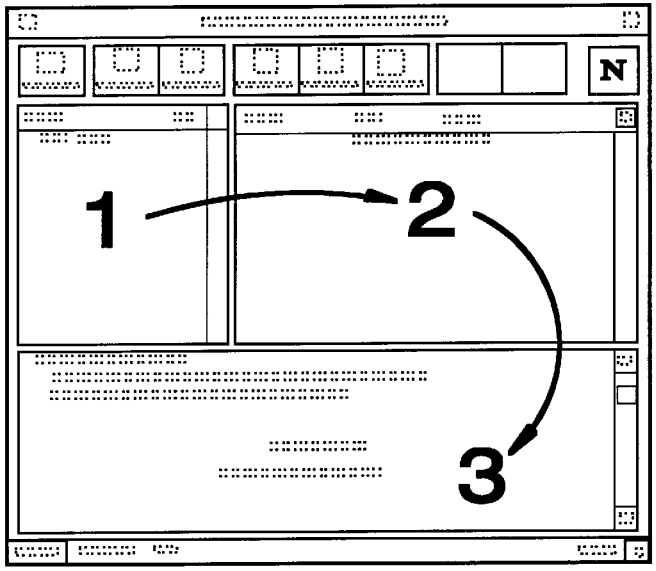
FIGS. 3(a)–3(c) provide examples of the three news layouts available in Netscape Navigator 3.0.
Figure 3B:
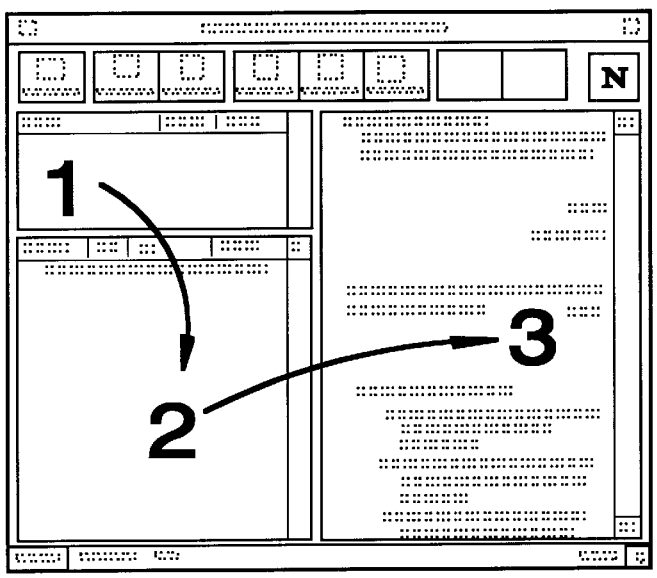
Figure 3C:
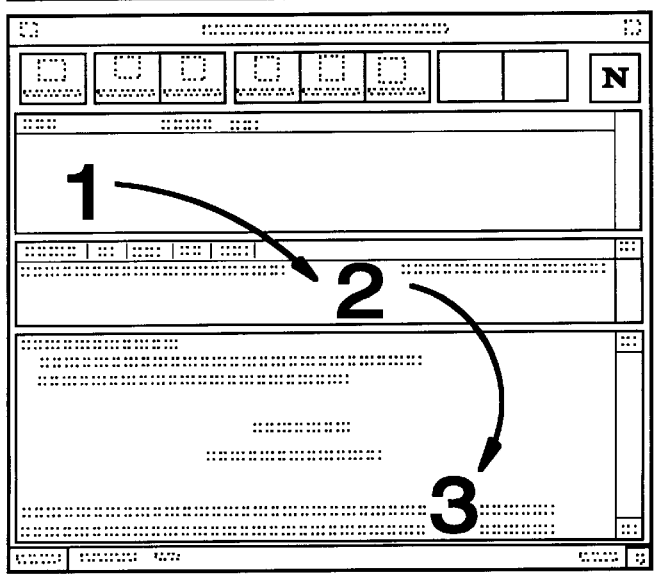
Figure 4:
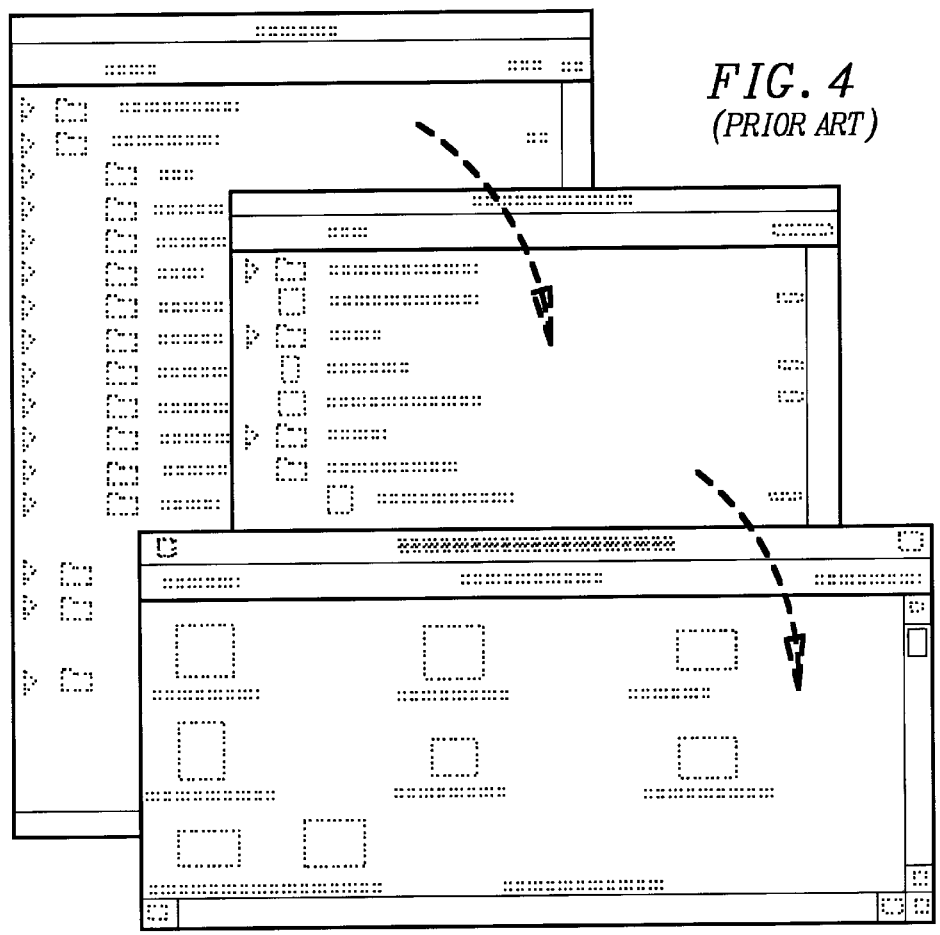
FIG. 4 depicts Macintosh Finder Windows.
Figure 5:
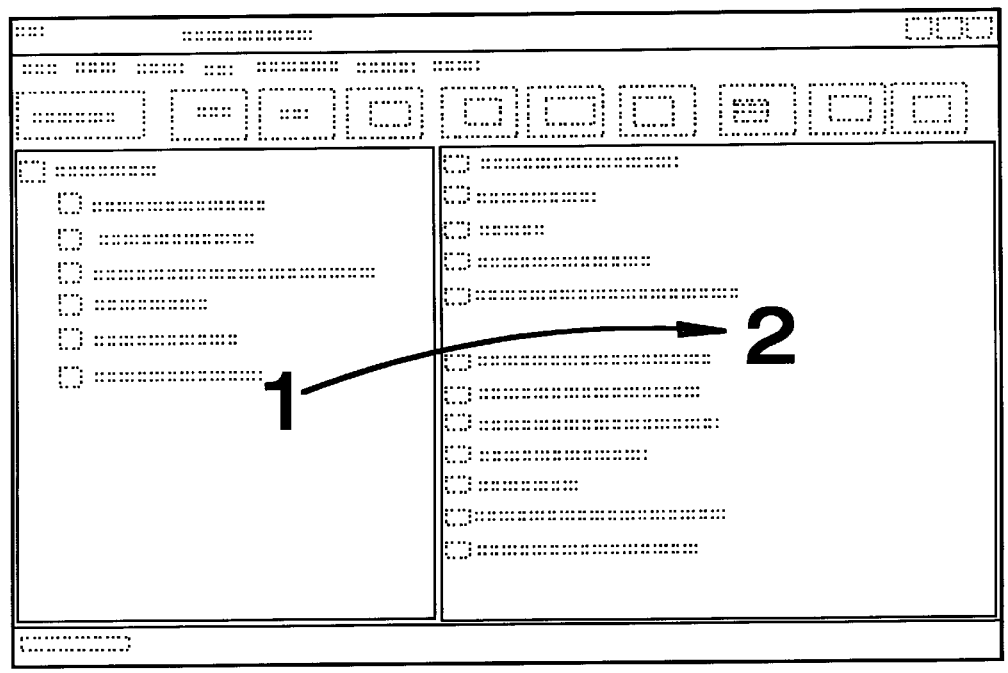
FIG. 5 depicts Microsoft Windows97 Explorer.
Figure 6:
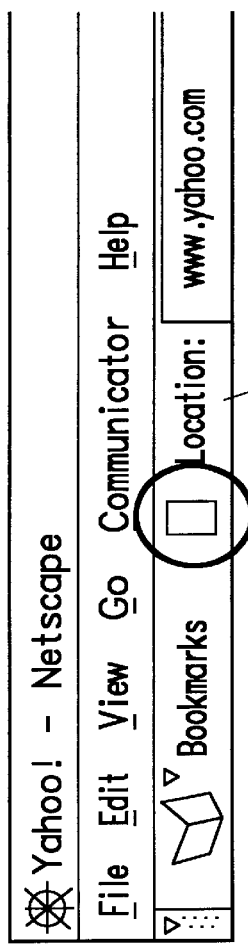
FIG. 6 is an iconic representation of a page in which the circled icon to the left of the "Location:" field is dragged to initiate a view link according to the invention.
Figure 7:
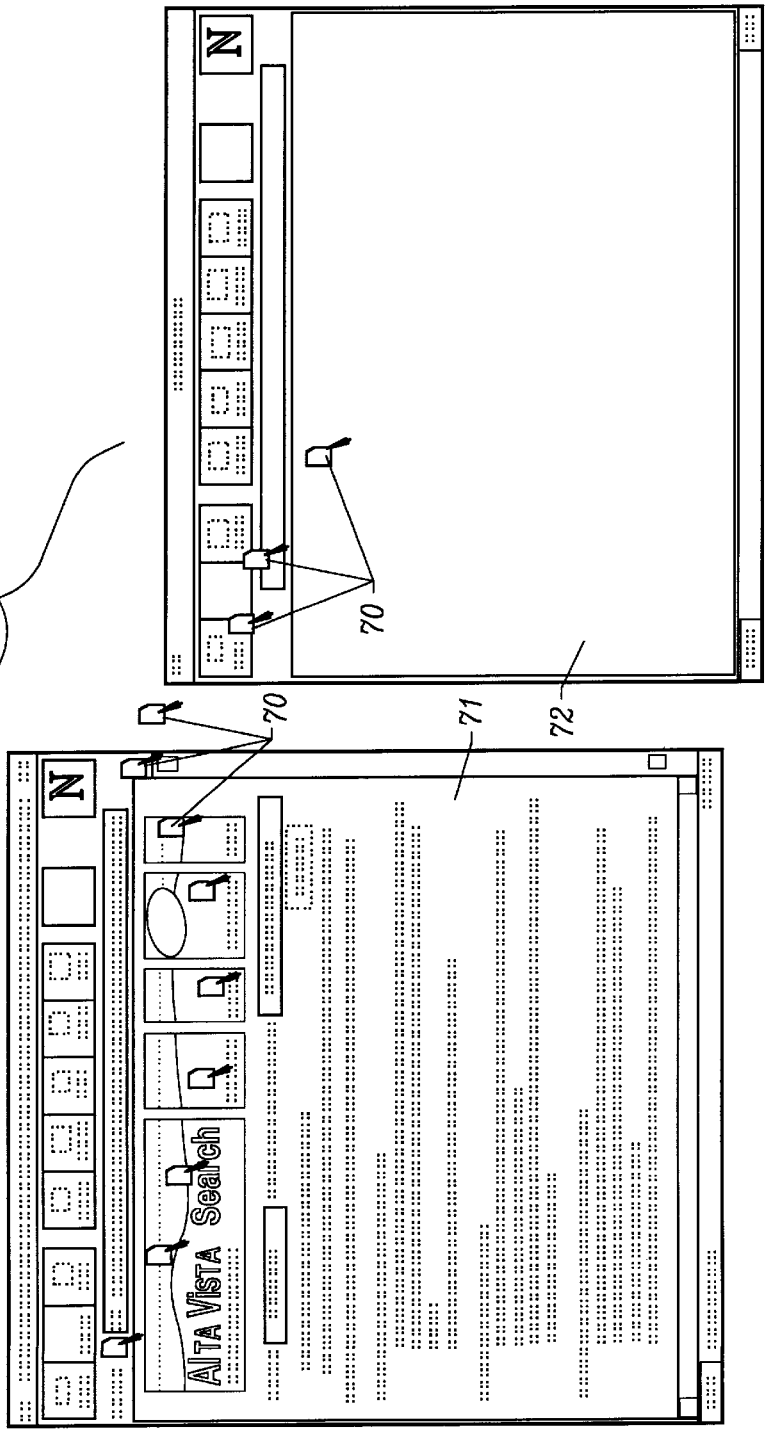
FIG. 7 illustrates the creation of a view link according to the invention.

FIG. 6 is an iconic representation of a page in which the circled icon to the left of the "Location:" field 60 is dragged to initiate a view link according to the invention. To specify a target, the user drags the iconic representation of a page (e.g. the existing document icon in Navigator as depicted in FIG. 6) into the content region of the desired target frame, as shown in FIG. 7. This establishes a permanent source target link between the two frames. A view link may also be established between a source view and a target view by user input with a non-cursor based metaphor including, for example, any of a menu, keyboard, and voice. Further, any particular view may have more than one active link at any given time.

FIG. 7 illustrates the creation of a view link according to the invention. The user drags an icon 70 representing the source view 71 and drops it onto the target view 72. The target view is highlighted while the icon is dragged across it, indicating that the window is a valid drop target.

FIG. 8 illustrates an example of a view link according to the invention. Whenever the user clicks on a link in the search results window 80 on the left, the link is expanded in the window 81 on the right, as indicated by the arrow overlay. Once the source-target relationship has been established, selecting a link in the source view displays the link in the target view, as shown in FIG. 8. The target view's contents are updated whenever a new link is selected in the source view. The user can resize or reposition either of the windows as usual. The linked relationship between the source and target windows is indicated by a source icon on the source view, and a target icon on the target view (as shown in FIG. 7). Clicking on either of these icons presents a pop up list of all the linked view's titles. Selecting a view's title from the list makes the selected view the active view.

The steps illustrated above describe only one of the many possible sets of interactions for creating a view link, following a link, and providing feedback between linked views. Many alternative interactions provide similar functionality. For example, alternative gestures for creating a view link include limiting the semantics of drag and drop view link creation such that the linking mechanism does not interfere with other drag and drop behaviors between views. For example, special dedicated controls in either the source or target views may be used to establish a link. Thus, the Apple Dylan programming environment (see Apple Dylan Technology Release, Apple Computer (1995)) uses a special input arrow on the source pane and a special output arrow on the target pane. Another alternative involves holding down a modifier key while dragging and dropping or voice actuation.

In the above example, a view link is followed by single clicking on a link anchor. Alternatively, the user could use, for example, any of a double click, option click, or right mouse click to expand the anchor across the view link. The view link feedback described above could also be replaced or augmented with other mechanisms for view link visualization. Such mechanisms are described in more detail below.

View Creation and Deletion Mechanisms

Even if there are mechanisms for customizing links between views, such mechanisms are of limited use if the user cannot create views and control their layout. This following discussion describes the presently preferred mechanism for creating and destroying new panes and windows.

Figure 9:
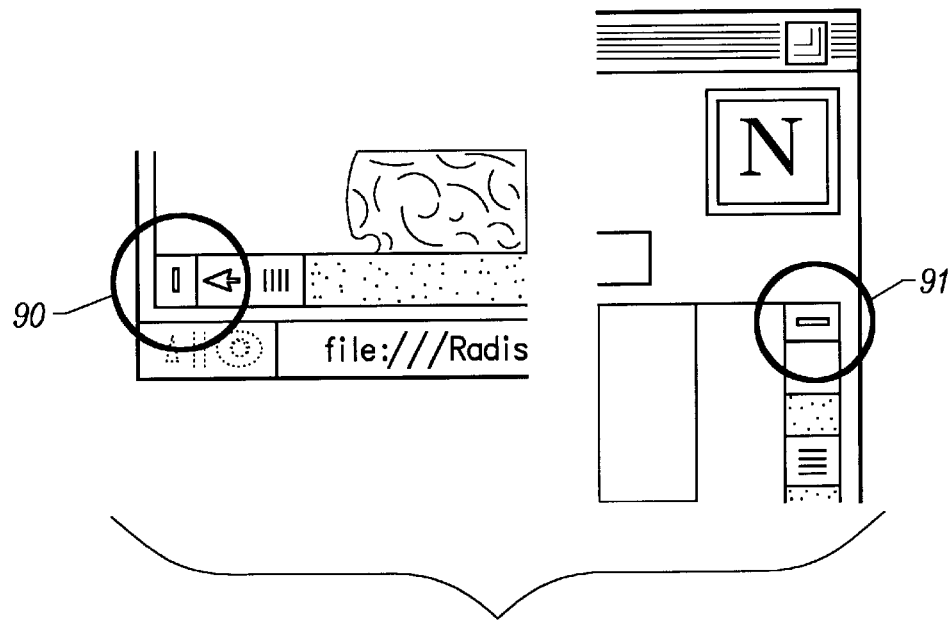
FIG. 9 illustrates horizontal and vertical splitters according to the invention.

To control the layout of multiple views within a single window, the user needs a way to create a new frame or pane. FIG. 9 illustrates horizontal and vertical splitters 90, 91 according to the invention. In the preferred embodiment of the invention, a new user interface widget, i.e. a view splitter, is added above the vertical scroll bar, and another is added to the left of the horizontal scroll bar, as shown in FIG. 9. These controls are placed at the end of each scroll bar. Clicking on a splitter splits the view in two.

Figure 10:
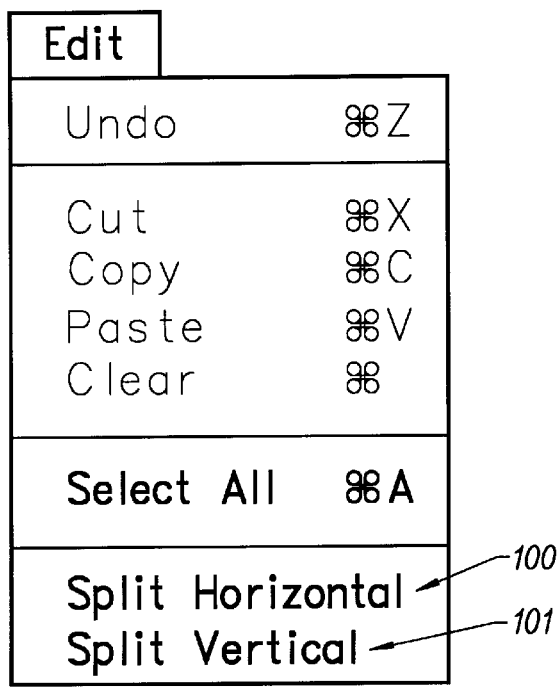
FIG. 10 illustrates menu commands for splitting views according to the invention.

FIG. 10 illustrates menu commands for splitting views according to the invention. In addition, two menu commands, split horizontal 100 and split vertical 101 are provided in the Edit menu, as shown in FIG. 10. These commands apply to the active view, and are needed because not all views are required to have scroll bars.

Figure 11:
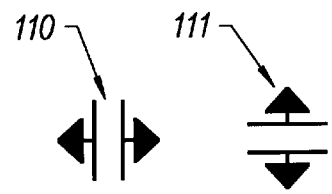
FIG. 11 illustrates cursor feedback according to the invention.

FIG. 11 illustrates cursor feedback mechanisms 110, 111 according to the invention. When the user drags out a pane splitter, the cursor is modified to provide feedback on the split operation.

The presently preferred method for creating a new view is by dragging a splitter to the desired split location in the window. While the splitter is being dragged, a special cursor shows that the pane is being split. As shown in FIG. 11, the cursor appears as either a vertical or horizontal pair of parallel lines with arrows, depending on the split direction or type of split. Another alternative interaction involves clicking on a splitter or choosing a menu command to create a new view by splitting the active view into two equally sized views. Variants of this technique have been employed in a limited way on several Web pages to allow users to create Mondrian-like art with frames (see M. Lewis, *The Mondrian Machine,* http://www.desires.com/2.1/Toys/Mondrian/mondfr.html).

The user also needs a way to open new windows. It is presently preferred to use the common double click for this command. However, a menu command may also be provided.

Once views and windows have been created, a way must be provided to destroy them as well. In the preferred embodiment of the invention, a menu command, i.e. delete pane, is provided to delete a view. In addition, a closebox widget can optionally be provided on the pane. Whole windows already have a closebox which is used to remove the window from the screen.

View Relationships

The following is a discussion of the various aspects of view relationships that the user may control. It should be appreciated that any particular view may have more than one active view link at any given time. Therefore, view links may be used to establish more than one relationship for a view.

Figure 12:
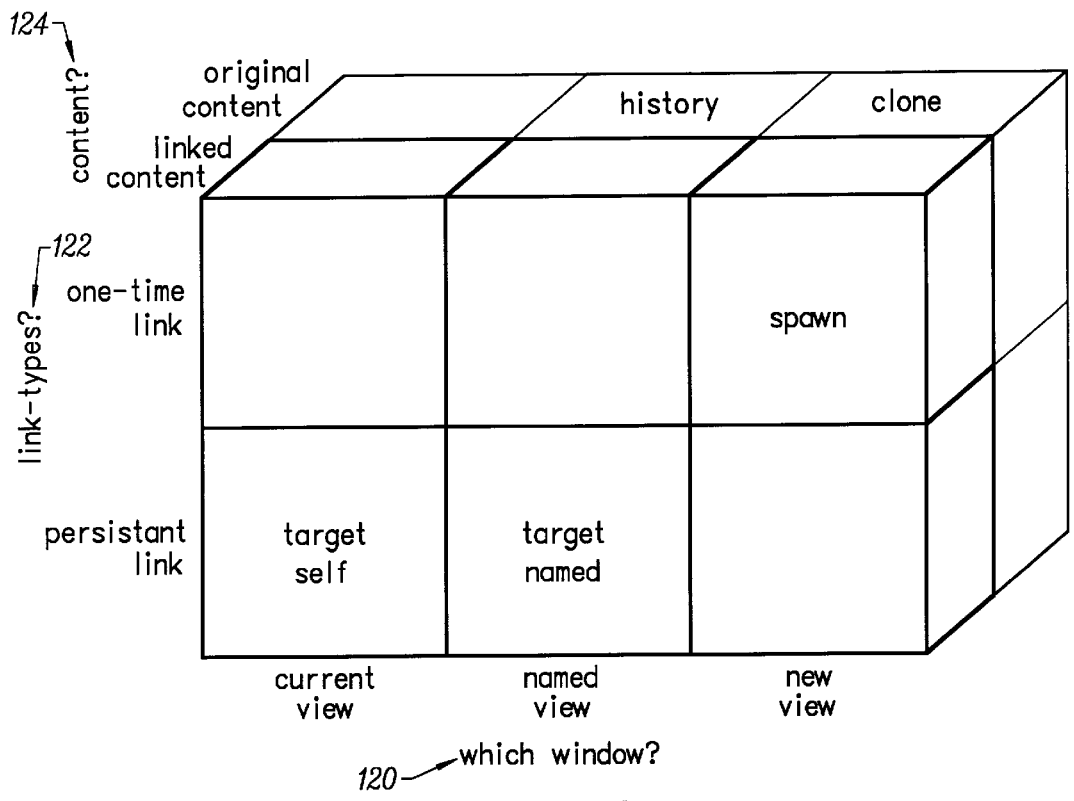
FIG. 12 illustrates three dimensions of view relationships, i.e. which window to target, what link type, and what content, according to the invention.

There are at least three variables to consider in specifying view relationships, i.e. which window is the target, the link type, and what content is expanded across the link. FIG. 12 illustrates three dimensions of view relationships, i.e. which window to target 120, what link type 122, and what content 124, according to the invention. The rest of the discussion herein describes various view relations that are expressible in this space.

Figure 13A:
FIGS. 13(a)–13(g) illustrate targeting diagram components, where
Figure 13B:
Figure 13C:
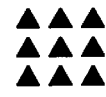
Figure 13D:
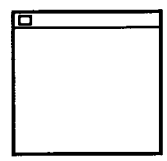
Figure 13E:
Figure 13F:
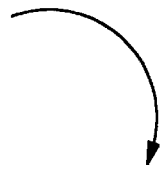
Figure 13G:

The term "content" as used herein refers to the objects displayed in a view. For example, in a Web browser the content is the text and links of an HTML page. In a file system, content is a collection of files and folders. A common visual language is used throughout the examples to help explain the relations, as shown in FIGS. 13(*a*)–13(*g*), which illustrate targeting diagram components, where FIG. 13(a) shows a triangle, circle and star which represent a source content; FIG. 13(b) shows selected objects are highlighted; FIG. 13(c) shows multiple smaller symbols that represent an expanded state of a selected content; FIG. 13(d) shows a rectangular window which represents a view; FIG. 13(e) shows an arrow that represents expanding a link's contents into a target view; FIG. 13 (f) shows an arrow that also represents moving a current context into a target; and FIG. 13(g) shows dashed arrows that indicate onetime only links according to the invention.

Targeting Primitives

The following discussion describes the basic targeting relationships that users need to express primitives that are already available to Web page authors through Netscape Frame extension commands in HTML. Although all of the targeting relationships defined below are described in terms of windows, the relationships apply to panes as well. Also, all of the relationships are described in terms of one target, but in general there can be any number of target views for the link.

Target Self

With the target self relationship, new content replaces the existing content in the current view. This is the default targeting relation in a Web browser, which is alternately referred to as a recycle or reuse behavior. The common or preferred interaction technique for this type of view link is either a single click or double click. FIGS. 14(a)–14(b) illustrate a target self operation, in which FIG. 14(a) shows before, where a user could select any of three objects; and FIG. 14(b) shows after, where the user selected a triangle, causing it to expand in place according to the invention. This target self behavior is found in the Netscape Navigator browser. It is also used in Open and Save As file dialog in the Windows95 and Macintosh Operating Systems.

Target Other

FIGS. 15(a)–15(c) illustrate a target other operation, in which FIG. 15(a) includes an arrow 151 that indicates an established view link between a source 150 and a target 152; FIG. 15(b) shows that when a user selects a triangle anchor 153 that a link is expanded in a right view; and FIG. 15(c) shows that when the user subsequently selects a circle link, a right view is updated to reflect a new expansion according to the invention. With the target other behavior, the contents of the source view remains unchanged, and the selected object's link is expanded in another specified view, as depicted in FIG. 15. A single click or double click is used as an interaction technique. Examples of the target other behavior include Netscape frames, Netscape Navigator mail, and many interactive programming environments.

Spawn

FIGS. 16(a)–16(c) illustrate a spawning operation, in which FIG. 16(a) shows a user beginning with a single view 160; FIG. 16(b) shows the user selecting a triangle object causing a new view 162 to be created containing the triangle's link expansion; and FIG. 16(c) shows that when the user selects another link to follow, in this case a circle link, another new view 164 is created containing the link's expansion according to the invention. With the spawn behavior, the existing content of the source view remains unchanged, and the selected object's link is expanded in a newly created view. The newly created view does not maintain a persistent link to the source view. The common interaction technique for this behavior is a double click. Many current applications exhibit this target new behavior. Common examples include Macintosh Finder windows, Meeting Maker Schedules, and the Netscape Communicator mail windows.

Clone

Figure 17C:
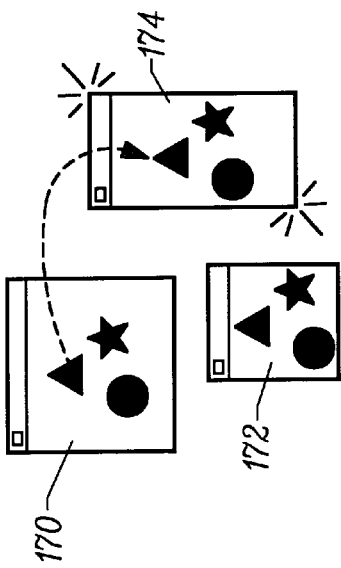
Figure 17B:
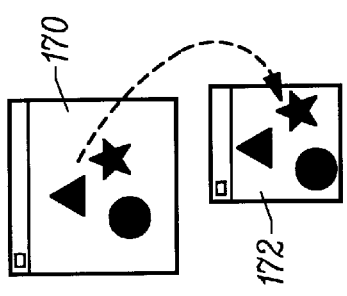
Figure 17A:
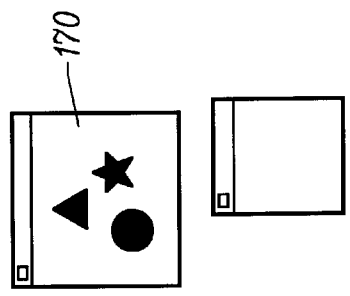

FIGS. 17(a)–17(c) illustrate a clone operation, in which FIG. 17(a) shows a user beginning with a single view 170; FIG. 17(b) shows that the content is cloned into an existing view 172 (the arrow is dashed because in this example, it is not a persistent link); and FIG. 17(c) shows that the content is then cloned again into a new view 174 according to the invention. Instead of expanding a link across the view link, the original content is pushed across the link and displayed in the target view. This is extremely useful for large view contexts, such as long HTML pages where the user would normally need to scroll to see two or more discontinuous regions within the view. Examples of this behavior in current applications include splitting panes in Microsoft Word and Excel.

Advanced Targeting Relations

Given the four basic targeting relationships described above, many other useful view relationships are available when the behavior of the link is varied. The one time target vs. ongoing target described above is one way to vary the link relation. However, when the source or target is dynamically determined, other useful view relations are possible, such as a dynamic source based upon selection, a dynamic target, and a history view.

Dynamic Source

Figure 18A:
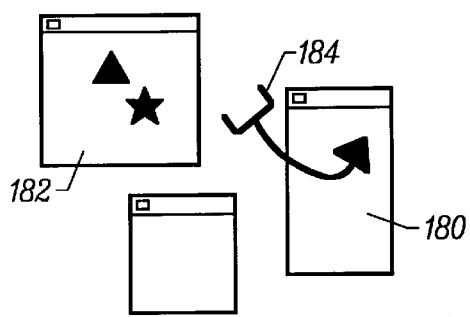
Figure 18B:
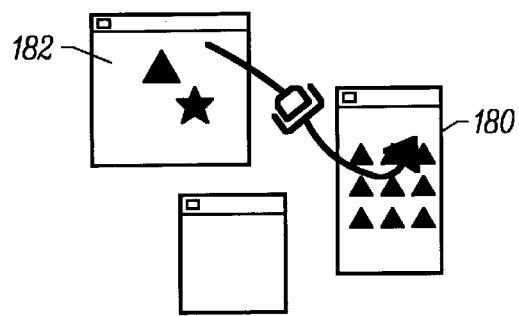
Figure 18C:
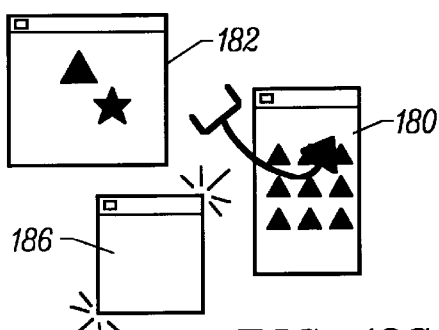
Figure 18D:
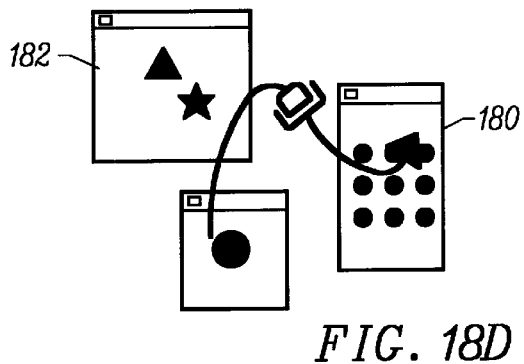

FIGS. 18(a)–(c) illustrate a dynamic source operation, in which FIG. 18(a) shows a target 180 that is always a right most view and a source 182 that is based upon an active view; FIG. 18(b) shows that when a triangle is selected in a left view, a target view 184 expands the triangle's link; FIG. 18(c) shows a new view that is created; and FIG. 18(d) shows the user selecting a new circle anchor in a bottom view 186 causing it to be expanded in a dedicated target view according to the invention. This is an extension of the target other embodiment discussed above, where the source target relation does not need to be predefined because the source view is defined dynamically. An example of this behavior is a selection based source relation determined by the active view. The target view expands the contents of whatever object is selected in the active view. This is useful when the user would like always to have information about the selection (such as properties) available in a well defined location. Palettes, such as those found in Quark, PageMill, and Photoshop behave in this manner.

Dynamic Target

Figure 19A:
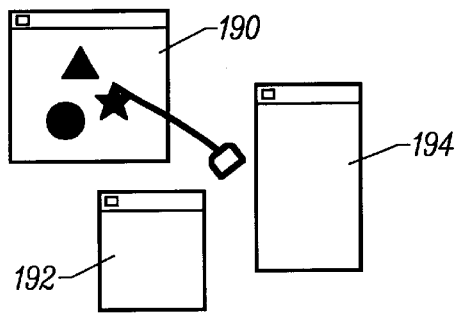
Figure 19B:
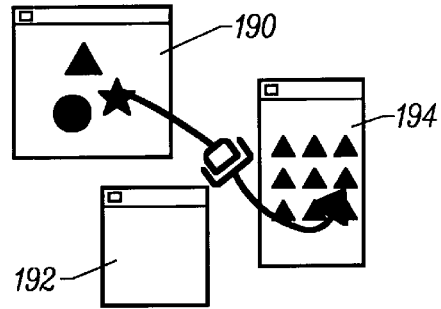
Figure 19C:
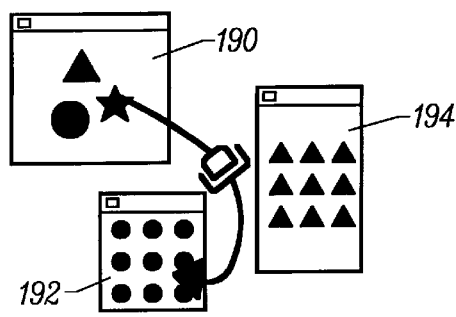
Figure 19D:
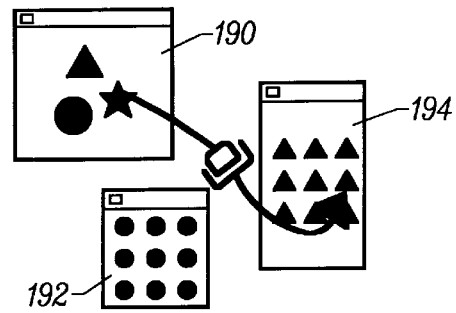

This embodiment of the invention is very similar to the target other embodiment, but the difference is that the target of the link iterates over a predefined set of views. FIGS. 19(a)–19(d) illustrate a dynamic target operation, in which FIG. 19(a) shows a source 190 that is fixed to be an upper left view; and FIGS. 19(b)–19(d) show that the target iterates between two views 192, 194 each time a link is followed. In FIGS. 19(a)–19(d), clicking on a link in the upper left view updates the view on the right. Clicking again on another link updates the lower left view. These two windows are iterated through indefinitely.

Dynamic targeting is not known to have an analog. The only specific example of a similar dynamic behavior is that of Elastic windows (see E. Kandogan, B. Shneiderman, *Elastic Windows: Evaluation of Multi Window Operations,* ACM Conference on Human Factors in Computing Systems SIGCHI 97 (March 1997)). In the Elastic windows system, the target is a new pane within the current window. Following a link dynamically creates a new pane.

History

Figure 20B:
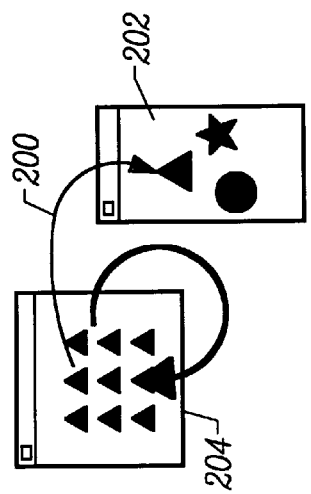
Figure 20A:
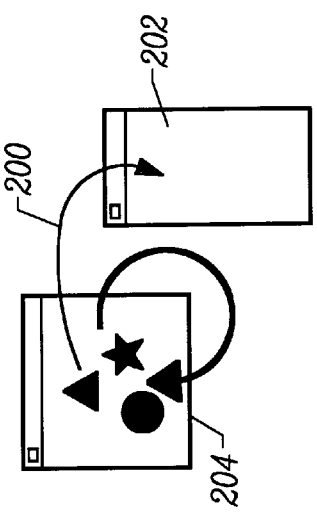

FIGS. 20(a)–20(b) illustrate a history operation, in which FIG. 20(a) shows an arrow 200 which indicates that selecting a link clones a current content into a right view 202; and FIG. 20(b) shows that a user selecting a triangle anchor causes the original contents to be cloned in a right view 202 and a triangle link to be expanded in an existing view 204. When replacing the contents of the current view, the old context can be placed in one or more history views, pushing context back. This is a variation of the dynamic source example discussed above. In this case, the history view is updated when content is pushed out of the active view because of a target self relation. In existing systems, there is no way to keep a set of views that represents history.

Link Filters

Figure 21:
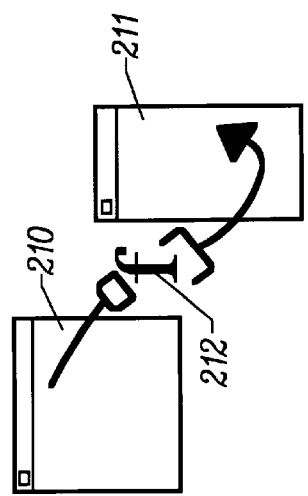
FIG. 21 illustrates a link filter function, in which filter functions transform or interpret the data transferred from a source to a target view according to the invention.

The foregoing discussion illustrates how useful it can be to vary either the source or the target view associated with a view link dynamically. Another way to extend view links is by allowing them to affect what it means to expand an object across the view link. FIG. 21 illustrates a link filter function, in which filter functions 212 transform or interpret the data transferred from a source 210 to a target view 211. The concept of a view link can be extended to include an associated filter function that transforms or interprets the data transferred from the source view to the target view.

One example of a link filter is a French translator. A dynamic source view link is associated with a dedicated view. Whenever the current selection is updated, a French translation appears in the view.

Another useful link filter is a summary view which comprises a dynamic source link that updated a dedicated window. In this example, when a link is followed, a one paragraph summary of the linked page's contents is displayed in the summary view. In this way, users may quickly get information about a series of linked pages to determine which page would be worth reading in its entirety.

In the context of a Web browser, one can think of each view link (or, alternatively, each view input or output) as having an associated proxy. Specialized proxies (e.g. zippers, ad filters, dynamic distillers, and text summarizers) can be used to express a wide range of behavior. Yet another way to think about filters is as Unix pipes. Yet another way to think about filters is associating a meta-content framework query with a view link.

EXTENSIONS

View Sets

Once the user can create and manipulate layouts and view links, it is useful to name and save sets of linked views for reuse. A saved group of views is referred to herein as a view set. In addition to source target relationships and view filter functions, view sets can store positioning and size information (relative or absolute) about views. As a restricted example, Macintosh Finder windows remember window position and size.

View Link Visualization

Users would like a way to visualize the many different view links that may exist in their environment. One simple way to show this is to have the user hold down a modifier key and have arrow overlays appear on top of the user's windows using a visual syntax/language, similar to the arrows that appear in connection with the embodiment of the invention discussed above.

Another method for visualizing links is to have a context sensitive menu available of the view that lists both the views that are targets of the current view, as well as views that are sources for the current view, e.g. a callers and callees menu. The user selects one of the views from this menu to make the selected view the active view.

Yet another way to visualize links between views would be for the target pane to highlight when the user's mouse passes over a link in the source view.

Aspects

Aspects describe the notion of having multiple view link filters associated with each view link. One filter is used by default, but at any point the user can override this default to set the function to be performed by the active link, and display a set of predefined functions from which to choose. This embodiment of the invention provides mechanisms for default associations, including context sensitive defaults. This allows the user to specify predefined sets of linked views with default associations that collectively form a template-like configuration. An aspect of this embodiment of the invention is a function from input view to output view. If there is a collection of objects in input view, then a function is applied to each object The default view filter function to be applied when following a view link can vary based upon the specified target view. If the target view does not specify any default for the view link filter function, then the default associated with the source may be used.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A method for user configurable view management, comprising the steps of:

providing at least three views, any of which may act as either or both of a source view and a target view; and establishing one or more view links between two or more of said views;

wherein any one or more of the following variables are provided for specifying a view relationship that is expanded across said view links;

a dynamic source operation comprising a target view that expands the contents of any object selected in any of a plurality of active views, wherein said source view is defined dynamically, a dynamic target operation comprising a target view that expands the contents of any object selected therein iteratively over a predefined set of views, a history operation comprising a first view wherein the entire contents thereof are expanded into a second view upon selection of any object therein, and wherein said selected object's contents are expanded into said first view, at least one link filter filter, comprising filter functions for either of transforming and interpreting data transferred from a source view to a target view, at least one view set comprising means for saving a group of views, view link visualization means for viewing any view links that may exist in said view link's environment, said view link visualization means comprising any of:
 a context sensitive menu for a view that lists both views that are targets of a current view, as well as views that are sources for said current view,
 a modifier key and have arrow overlays which appear on top of a user's windows using a visual syntax/language, and
 a target pane that is highlighted when the user's mouse passes over a link in the source view, and at least one aspect which comprises a plurality of view link filters associated with each view link, wherein a first filter is used by default, and wherein at any point a user can override said default to set a function to be performed by the active link, and wherein said user can display a set of predefined functions from which to choose.

2. The method of claim 1, wherein one or more contexts is dynamically computed each time a corresponding link is followed.

3. The method of claim 1, further comprising the step of:
 providing a dynamic source view link associated with a context that comprises a dedicated view.

4. The method of claim 1, further comprising the step of:
 providing a summary view which comprises a dynamic source link that updates a context which comprises dedicated window.

5. The method of claim 1, wherein at least one of said one or more view links establishes said history operation, in which an old context is placed in one or more history views when replacing contents of a current view.

6. The method of claim 1, wherein at least one of said one or more view links is implemented between said source view and said target view by a display-based gesture.

7. The method of claim 1, wherein at least one of said one or more view links is implemented between said source view and said target view by user input with a non-cursor based metaphor including any of a menu, keyboard, and voice.

8. The method of claim 4, wherein visual indicia are associated with said target view, indicating that said target view is a valid drop target.

9. The method of claim 3, wherein visual indicia are provided to indicate a linked relationship between said source view and said target view.

10. The method of claim 1, further comprising the step of:
 providing dedicated controls in either said source view or said target view to establish at least one of said one or more view links.

11. The method of claim 1, wherein at least one of said one or more view links establishes a target self relationship, in which new content replaces existing content in a current view.

12. The method of claim 1, wherein at least one of said one or more view links establishes a target other operation, in which contents of a source view remain unchanged, and a selected object's link is expanded in another specified view.

13. The method of claim 1, wherein at least one of said one or more view links establishes a spawning operation, in which existing content of said source view remains unchanged, and a selected object's link is expanded in a newly created view that does not maintain a persistent link to said source view.

14. The method of claim 1, wherein at least one of said one or more view links establishes a clone operation, in which original content is pushed across said view link and displayed in said target view.

15. The method of claim 1, further comprising the step of:
 providing a mechanism for visualizing different view links that may exist in their environment.

16. The method of claim 1, wherein any particular context may be involved in more than one view link relationship at any given time.

17. An apparatus for user configurable view management in a programmable machine including a display, said apparatus comprising:
 means for providing at least three views, any of which may act as either or both of a source view and a target view on said display; and
 means for dynamically establishing a view link on said display between two or more of said views;
 wherein any one or more of the following variables are provided for specifying a view relationship that is expanded across the view link:
 a dynamic source comprising a target view that expands the contents of any object selected in any of a plurality of active views, wherein said source view is defined dynamically,
 a dynamic target comprising a target view that expands the contents of any object selected therein iteratively over a predefined set of views,
 a history operation comprising a first view wherein the entire contents thereof are expanded into a second view upon selection of any object therein, and wherein said selected object's contents are expanded into said first view,
 at least one link filter filter, comprising filter functions for either of transforming and interpreting data transferred from a source view to a target view,
 at least one view set comprising means for saving a group of views,
 view link visualization means for viewing any view links that may exist in said view link's environment, said view link visualization means comprising any of:
  a context sensitive menu for a view that lists both views that are targets of a current view, as well as views that are sources for said current view,
  a modifier key and have arrow overlays which appear on top of a user's windows using a visual syntax/language, and
  a target pane that is highlighted when the user's mouse passes over a link in the source view, and
 at least one aspect which comprises a plurality of view link filters associated with each view link, wherein a first filter is used by default, and wherein at any point a user can override said default to set a function to be performed by the active link, and wherein said user can display a set of predefined functions from which to choose.

18. The apparatus of claim 17, wherein said one or more contexts is dynamically computed each time a corresponding link is followed.

19. The apparatus of claim 17, further comprising:
a dynamic source view link associated with a context that comprises a dedicated view.

20. The apparatus of claim 1, further comprising:
a summary view which comprises a dynamic source link that updates a context which comprises dedicated window.

21. The apparatus of claim 1, wherein at least one of said one or more view links establishes said history operation, in which an old context is placed in one or more history views when replacing contents of a current view.

22. The apparatus of claim 1, wherein at least one of said one or more view links is implemented between said source view and said target view by a display-based gesture.

23. The apparatus of claim 1, wherein at least one of said one or more view links is implemented between said source view and said target view by user input with a non-cursor based metaphor including any of a menu, keyboard, and voice.

24. The apparatus of claim 20, wherein visual indicia are associated with said target view, indicating that said target view is a valid drop target.

25. The apparatus of claim 19, wherein visual indicia are provided to indicate a linked relationship between said source view and said target view.

26. The apparatus of claim 17, further comprising:
providing dedicated controls in either said source view or said target view to establish at least one of said one or more view links.

27. The apparatus of claim 17, wherein at least one of said one or more view links establishes a target self relationship, in which new content replaces existing content in a current view.

28. The apparatus of claim 17, wherein at least one of said one or more view links establishes a target other operation, in which contents of a source view remain unchanged, and a selected object's link is expanded in another specified view.

29. The apparatus of claim 17, wherein at least one of said one or more view links establishes a spawning operation, in which existing content of said source view remains unchanged, and a selected object's link is expanded in a newly created view that does not maintain a persistent link to said source view.

30. The apparatus of claim 17, wherein at least one of said one or more view links establishes a clone operation, in which original content is pushed across said view link and displayed in said target view.

31. The apparatus of claim 17, further comprising:
providing a mechanism for visualizing different view links that may exist in their environment.

32. The apparatus of claim 17, wherein any particular context may be involved in more than one view link relationship at any given time.

* * * * *